United States Patent
Maeda

[11] Patent Number: 5,969,087
[45] Date of Patent: Oct. 19, 1999

[54] POLYIMIDE, A METHOD FOR MANUFACTURING THE SAME, A GAS SEPARATION MEMBRANE USING THE POLYIMIDE AND A METHOD FOR MANUFACTURING THE SAME

[75] Inventor: Masatoshi Maeda, Osaka, Japan

[73] Assignee: Nitto Denko Corporation, Osaka, Japan

[21] Appl. No.: 09/052,682

[22] Filed: Mar. 31, 1998

[30] Foreign Application Priority Data

Apr. 4, 1997 [JP] Japan ................................. 9-087060

[51] Int. Cl.[6] .................................................. C08G 73/10
[52] U.S. Cl. ........................... 528/353; 528/26; 528/125; 528/128; 528/171; 528/172; 528/173; 528/174; 528/175; 528/183; 528/188; 528/220; 528/224; 528/229; 528/350; 96/4; 96/8; 96/13; 96/14; 95/43; 95/45; 428/473.5
[58] Field of Search .............................. 528/26, 125, 128, 528/172, 173, 174, 171, 353, 175, 183, 188, 220, 224, 229, 350; 96/4, 8, 13, 14; 95/43, 45; 428/473.5

[56] References Cited

U.S. PATENT DOCUMENTS

| | | | |
|---|---|---|---|
| 3,853,754 | 12/1974 | Gosser | 502/152 |
| 3,947,402 | 3/1976 | Vollkommer et al. | 528/481 |
| 4,297,362 | 10/1981 | Losher et al. | 424/263 |
| 4,717,394 | 1/1988 | Hayes | 55/16 |
| 5,470,943 | 11/1995 | Sakata et al. | 528/353 |
| 5,473,040 | 12/1995 | Kunimune et al. | 528/26 |
| 5,614,099 | 3/1997 | Hirose et al. | 210/653 |
| 5,665,802 | 9/1997 | Maki et al. | 524/141 |
| 5,674,398 | 10/1997 | Hirose et al. | 210/500.38 |
| 5,702,503 | 12/1997 | Tse Tang | 55/524 |
| 5,817,165 | 10/1998 | Hachisuka et al. | 96/4 |
| 5,821,320 | 10/1998 | Maeda et al. | 528/173 |

FOREIGN PATENT DOCUMENTS 0156495  10/1985  European Pat. Off. .

OTHER PUBLICATIONS 1990, month not available, H. Yamamoto et al. "Structure/Permeability Relationships of Polyimide Membranes. II", *Journal of Polymer Science: Part B: Polymer Physics*, vol. 28, pp. 2291–2304.

*Primary Examiner*—P. Hampton-Hightower
*Attorney, Agent, or Firm*—Merchant, Gould, Smith, Edell, Welter & Schmidt, P.A.

[57] ABSTRACT

A novel polyimide having a repeating structure unit expressed by the following general formula (1), a method for manufacturing the same, a gas separation membrane using the novel polyimide and the method for manufacturing the same. The gas separation membrane using this polyimide is excellent in gas permeable performance and separation selectivity for gas, for example, carbon dioxide, methane, etc.

General Formula (1)

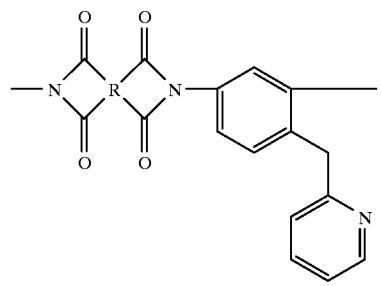

where R denotes a quadrivalent organic group.

34 Claims, 2 Drawing Sheets

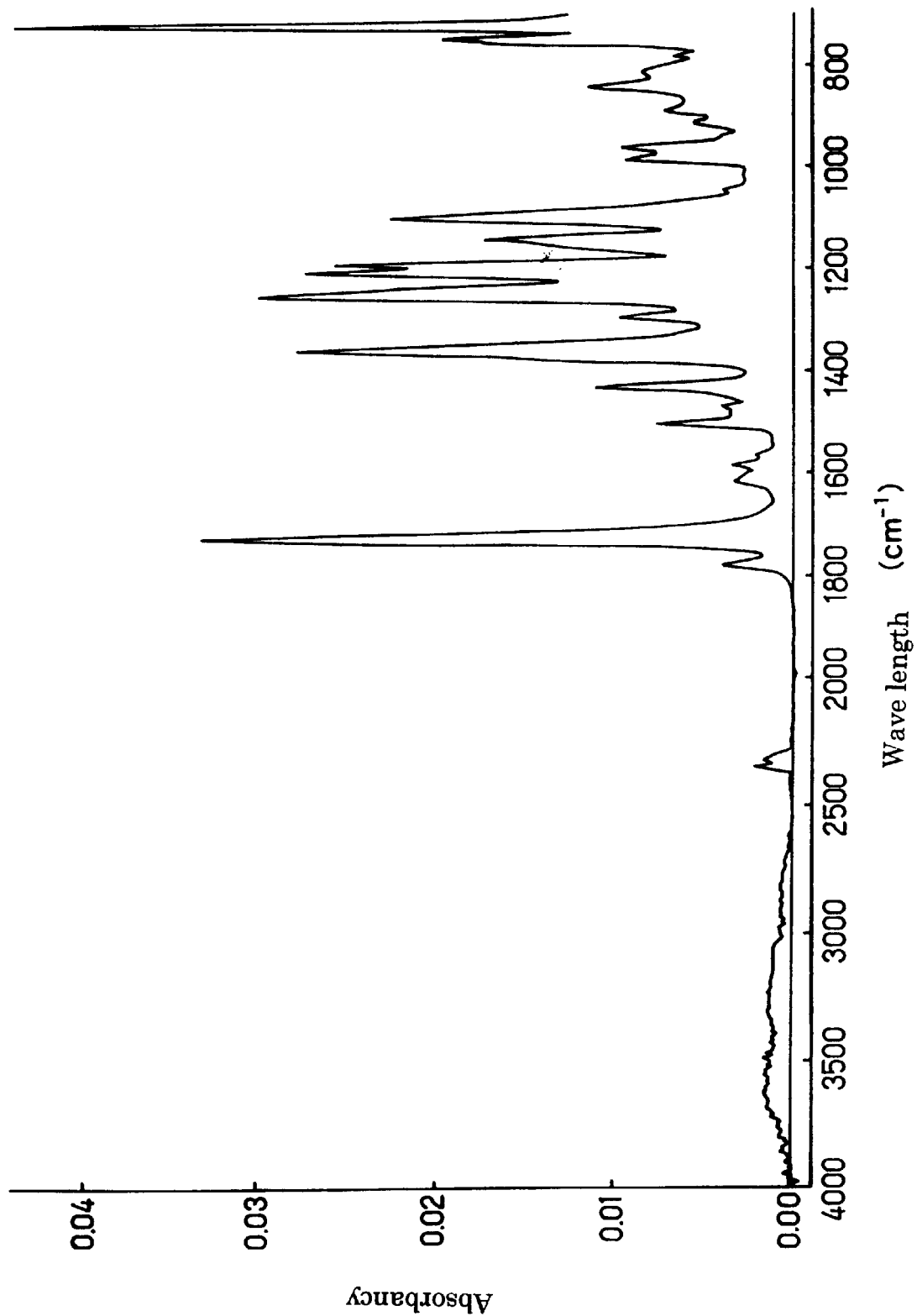

POLYIMIDE, A METHOD FOR MANUFACTURING THE SAME, A GAS SEPARATION MEMBRANE USING THE POLYIMIDE AND A METHOD FOR MANUFACTURING THE SAME

FIELD OF THE INVENTION

The present invention relates to a novel polyimide, a method for manufacturing the same, a gas separation membrane using the novel polyimide and the method for manufacturing the same.

The gas separation membrane of the present invention has not only excellent selective permeability performance but also good moisture resistance, chemical resistance, etc. Moreover, gas separation using the present membrane is useful in various fields because it is effective in terms of energy efficiency as compared with other gas separation methods. The membrane of the present invention is used for, for example, separation and collection of hydrogen at the time of synthesizing ammonia; collection of carbon dioxide or elimination of sulfur oxide and nitrogen oxide from exhaust gas emitted from a thermal electric power plant and an incineration plant; collection of carbon dioxide from off gas of an oil field; elimination of hydrogen sulfide and carbon dioxide or separation of helium from natural gas; collection of gasoline leaked from a gasoline station; pervaporation separation in a liquid mixture comprising volatile materials; elimination of gas dissolved in liquid; separation between oxygen and nitrogen in air, and the like.

BACKGROUND OF THE INVENTION

Hitherto, as a gas separation membrane, a cellulose acetate membrane has been well known. However, the cellulose acetate membrane is insufficient in chemical resistance, thermal resistance, etc. Therefore, it cannot be said that the cellulose acetate membrane has a practically sufficient performance. Moreover, as a membrane whose thermal resistance property is improved, a polysulfone semipermeable membrane is industrially manufactured, but it also is insufficient in permeation performance. Moreover, a silicone membrane is well known as a selective permeation membrane of oxygen. However, silicone cannot provide a sufficient mechanical strength and be industrially satisfactory.

Recently, researches and developments of a polyimide resin separating membrane excellent in strength, heat resistance and gas selective permeability have been conducted.

Journal Polymer Science Polymer Physics (J.polym. Scie. Polym. Phys., 28, 2291 (1990)) describes an aromatic polyimide membrane having high gas permeability and selectivity, which is made from a phenylenediamine component in which one ortho position amine functional group is replaced by an alkyl group. Moreover, U.S. Pat. No. 4,717,394 and Japanese Patent Application Tokkai No. Sho 63-123420 describe an aromatic polyimide membrane having high gas permeability, which is made from phenylenediamine in which all ortho position amine functional groups are replaced by alkyl groups.

However, a polyimide having higher permeation performance and high separation selectivity and a gas separation membrane using such polyimide are still demanded.

SUMMARY OF THE INVENTION

It is an object of the present invention to provide a novel polyimide having more excellent permeation performance, high permeability and high separation selectivity, and having excellent chemical resistance and moisture resistance, etc., a method for manufacturing the same, a gas separation membrane using the novel polyimide and a method for manufacturing the same.

The present inventors have intensively investigated in order to avoid the above mentioned problems of the conventional gas separation membranes, and reached a polyimide obtained by condensation polymerizing tetracarboxylic acid dianhydride, which is a precursor of a quadrivalent residual group for forming polyimide and 2-(2,4-diaminobenzyl) pyridine as a diamine component forming a divalent residual group, and a gas separation membrane using the above polyimide, thereby completing the present invention.

In other words, the polyimide of the present invention has the repeating structure unit expressed by the following general formula (1):

General Formula (1)

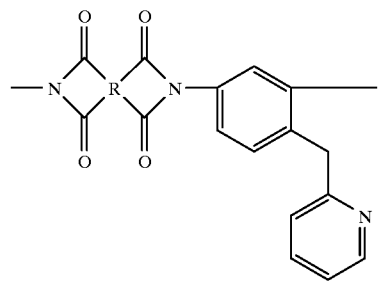

where R denotes a quadrivalent organic group.

It is preferable in the above mentioned polyimide that the quadrivalent organic group is at least one organic group selected from the group consisting of organic groups expressed by the following general formulas (2) to (4):

General Formula (2)

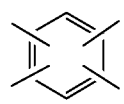

General Formula (3)

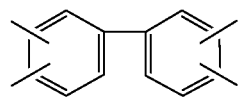

General Formula (4)

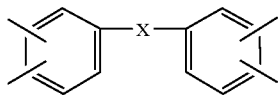

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —CF$_2$CF$_2$CF$_2$—, —CO—C$_6$H$_4$—CO—, and —O—C$_6$H$_4$—S—C$_6$H$_4$—O—.

Furthermore, in the above mentioned polyimide, the glass transition temperature is about 303° C.

Furthermore, in the above mentioned polyimide, gas permeability coefficients of the polyimide (Barrer=10$^{-10}$ cm$^3$(STP) cm/cm$^2$/sec/cmHg, where cm$^3$ (STP) shows a volume of gas that permeates under normal temperature (0°C.) and normal pressure (1 atm), cm shows a thickness of a film, cm$^2$ shows an area of a film, sec shows a time (second), and cmHg shows a pressure, and where the values are measured at 25° C. and 1 atm) are about 7.22 Barrer for O$_2$, about 1.67 Barrer for CH$_4$, about 1.34 Barrer for N$_2$ and about 54.9 Barrer for CO$_2$.

Furthermore, it is preferable in the above mentioned polyimide that the polyimide can be dissolved in a polar solvent. The polar solvent may be one solvent selected from the group consisting of N-methyl-2-pyrrolidone, N,N-dimethylacetamide, dimethyl sulfoxide, and N,N-dimethylformamide.

Next, the method for manufacturing a polyimide of the present invention is characterized in that a polyimide having a repeating structure unit expressed by the following general formula (7) is obtained by condensation polymerizing a tetracarboxylic acid dianhydride expressed by the following general formula (5) and diamine expressed by the following general formula (6):

General Formula (5)

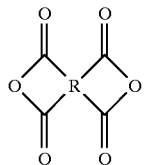

where R denotes a quadrivalent organic group;

General Formula (6)

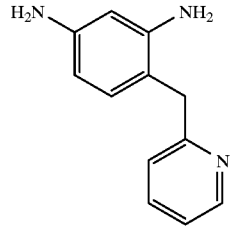

General Formula (7)

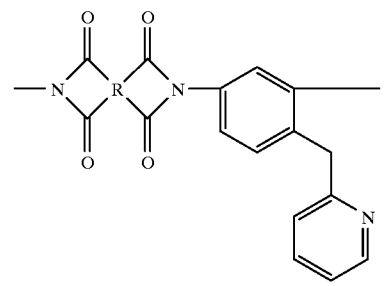

where R denotes a quadrivalent organic group.

It is preferable in the above mentioned method that the quadrivalent organic group is at least one organic group selected from the group consisting of organic groups expressed by the following general formulas (8) to (10);

General Formula (8)

General Formula (9)

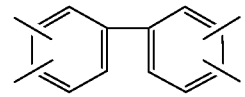

General Formula (10)

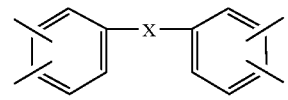

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —CF$_2$CF$_2$CF$_2$—, —CO—C$_6$H$_4$—CO—, and —O—C$_6$H$_4$—S—C$_6$H$_4$—O—.

It is also preferable in the above mentioned method that the condensation polymerization is conducted in a polar solution. It is preferable that the polar solvent is one solvent selected from the group consisting of N-methyl-2-pyrrolidone, N,N-dimethylacetamide, dimethyl sulfoxide and N,N-dimethylformamide. The preferable amount of use of the polar solvent is in the range of 70 to 90 weight % concentration with respect to the weight of the reaction system.

It is also preferable in the above mentioned method that the condensation polymerization comprises the steps of synthesizing polyamic acid by mixing diamine component and tetracarboxylic acid dianhydride component to react below room temperature (in the range of 0 to 20° C.) for 5 to 50 hours; and polyimidizing the polyamic acid.

It is also preferable in the above mentioned method that the polyamic acid is polyimidized by adding a cyclodehydrating agent to the reacting solution and reacting for 5 to 24 hours during said step of polyimidizing the polyamic acid.

It is also preferable in the above mentioned method that the cyclodehydrating agent is at least one compound selected from the group consisting of acetic anhydride, pyridine and triethylamine.

It is also preferable in the above mentioned method that the step of polyimidizing polyamic acid comprises heating polyamic acid to 180 to 200° C.; and adding a solution azeotropic with water to react for 5 to 10 hours while removing water generated due to the cyclization of amic acid out of the system by azeotropy.

It is also preferable in the above mentioned method that the solution azeotropic with water is at least one solution selected from the group consisting of benzene, toluene, xylene, chlorobenzene and dichlorobenzene.

It is also preferable in the above mentioned method that the polyimide is dissolved in a polar solvent.

It is also preferable in the above mentioned method that the polar solvent is at least one solvent selected from the group consisting of N-methyl-2-pyrrolidone, N,N-dimethylacetamide, dimethyl sulfoxide, and N,N-dimethylformamide.

Next, the gas separation membrane of the present invention comprises a polyimide having a repeating structure unit expressed by the following general formula (11) in the gas separation layer:

General Formula (11)

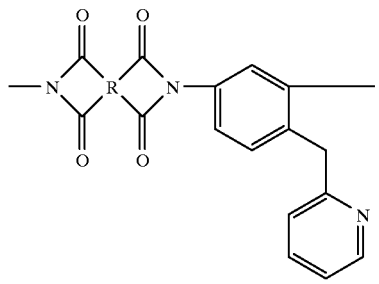

where R denotes a quadrivalent organic group.

It is preferable in the gas separation membrane that the quadrivalent organic group is at least one organic group selected from the group consisting of organic groups expressed by the following general formulas (12) to (14):

General Formula (12)

General Formula (13)

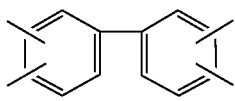

General Formula (14)

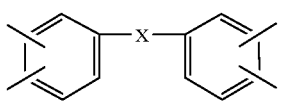

where X denotes at least one group selected from the group consisting of $-C(CF_3)_2-$, $-C(CF_3)(C_6H_5)-$, $-C(CH_3)(C_6H_5)-$, $-CH_2-$, $-C(CH_3)_2-$, $-CO-$, $-SO_2-$, $-O-$, $-S-$, $-NH-$, $-COO-$, $-CONH-$, $-Si(CH_3)_2-$, $-O-C_6H_4-C(CH_3)_2-C_6H_4-O-$, $-O-C_6H_4-O-$, $-O-CH_2-CH_2-O-$, $-CF_2CF_2CF_2-$, $-CO-C_6H_4-CO-$, and $-O-C_6H_4-S-C_6H_4-O-$.

It is preferable in the above mentioned gas separation membrane that the glass transition temperature of the polyimide is about 303° C.

It is preferable in the above mentioned gas separation membrane that the gas permeability coefficients of the polyimide (Barrer=$10^{-10}$ cm$^3$ (STP) cm/cm$^2$/sec/cmHg, where cm$_3$ (STP) shows a volume of gas that permeates at normal temperature (0° C.) and normal pressure (1 atm), cm shows a thickness of a film, cm$^2$ shows an area of a film, sec shows a time (second), and cmHg shows a pressure, and where the values are measured at 25° C. and 1 atm) are about 7.22 Barrer for $O_2$, about 1.67 Barrer for $CH_4$, about 1.34 Barrer for $N_2$ and about 54.9 Barrer for $CO_2$.

It is preferable in the above mentioned gas separation membrane that the gas permeable selectivity of the polyimide membrane are about 5.38 for $O_2/N_2$; about 1.25 for $CH_4/N_2$; and about 40.9 for $CO_2/N_2$.

It is preferable in the above mentioned gas separation membrane that the thickness of the polyimide membrane is in the range of 0.03 to 20 μm.

It is preferable in the above mentioned gas separation membrane that the polyimide membrane is formed on a surface layer of a supporting member having a smooth surface.

It is preferable in the above mentioned gas separation membrane that the polyimide membrane is at least one membrane selected from the group consisting of a flat membrane and a hollow fiber membrane.

It is preferable in the above mentioned gas separation membrane that the polyimide is dissolved in a polar solvent.

It is preferable in the above mentioned gas separation membrane that the polar solvent is at least one solvent selected from the group consisting of N-methyl-2-pyrrolidone, N,N-dimethylacetamide, dimethyl sulfoxide and N,N-dimethylformamide.

It is preferable in the above mentioned gas separation membrane that the intrinsic viscosity of the polyimide is in the range of 0.4 to 1.5 dL/g when measured with a solution in which 0.5 g of polyimide is dissolved in 1 dl of N-methyl-2-pyrrolidone is at 30° C.

Next, the method for manufacturing the gas permeation membrane of the present invention comprises dissolving polyimide having a repeating structure unit expressed by the following general formula (15) in a polar solvent; and forming at least one membrane selected from the group consisting of a flat membrane and a hollow fiber membrane General Formula (15)

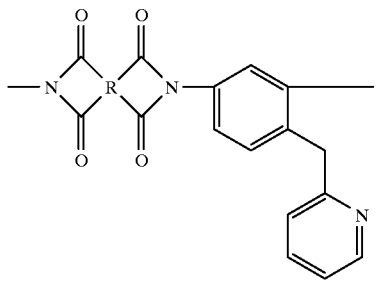

where R denotes a quadrivalent organic group.

It is preferable in the above mentioned method that the quadrivalent organic group is at least one organic group selected from the group consisting of organic groups expressed by the following general formulas (16) to (18):

General Formula (16)

General Formula (17)

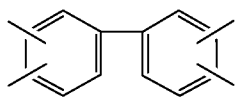

General Formula (18)

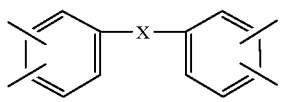

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —CF$_2$CF$_2$CF$_2$—, —CO—C$_6$H$_4$—CO—, and —O—C$_6$H$_4$—S—C$_6$H$_4$—O—.

It is also preferable that the above mentioned method comprises casting a solution containing polyimide onto the surface layer of a supporting member having a smooth surface; and then removing the solvent.

It is also preferable in the above mentioned method that the step of removing the solvent is one process selected from the group consisting of a process of heating and drying, a process of drying under reduced pressure, and a process in which the solvent is dissolved by dipping in an organic solvent that is a poor solvent for the polyimide.

As explained above, the polyimide gas separation membrane of the present invention has high gas permeation property and selectivity, and is excellent in weather resistance and chemical resistance, so that it can be used as a gas separation membrane in a wide variety of fields.

BRIEF DESCRIPTION OF THE DRAWINGS

FIG. 2 is an analysis chart by infrared analysis (IR) of polyimide according to Example 1 of the present invention.

DETAILED DESCRIPTION OF THE INVENTION

Figure 1:
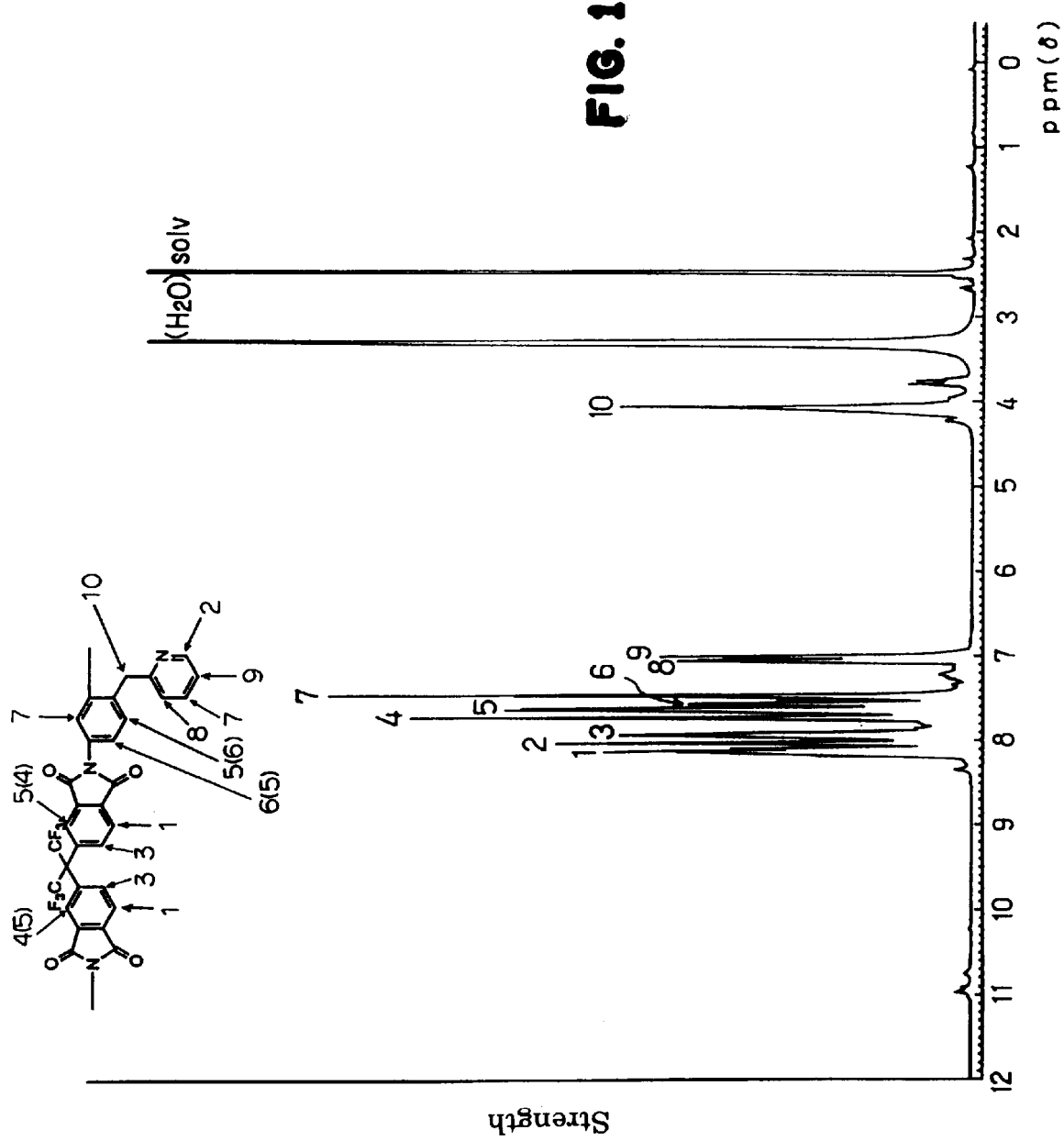
FIG. 1 is an analysis chart by nuclear magnetic resonance (NMR) of the polyimide according to Example 1 of the present invention.

The compound expressed by the above mentioned general formula (1) can be manufactured by equimolar condensation polymerization of diamines expressed by general formulas (5) and (6). The polymerization method is not particularly limited, and general polymerization methods can be employed. As the solvent for polymerization, N-methyl-2-pyrrolidone, N,N-dimethylacetamide, dimethyl sulfoxide, N,N-dimethylformamide, and the like are examples. The solvents may be used singly or in combinations thereof. The amount of solvent to be used with respect to a raw material is not particularly limited, but it is generally in the range of 70 to 90 weight % concentration. The first method for manufacturing a polyimide comprises synthesizing polyamic acid by mixing a diamine component and tetracarboxylic acid dianhydride to react therewith below room temperature for, in general, 5 to 50 hours; and adding a cyclodehydrating agent such as acetic anhydride, pyridine, triethylamine, etc. to the reaction solution to further react at room temperature for, in general, 5 to 24 hours. Another method for manufacturing polyimide comprises heating the polyamic acid to 180 to 200° C.; adding a hydrocarbon system or chloride system solution that can be azeotropic with water, for example, benzene, toluene, xylene, chlorobenzene and dichlorobenzene; and reacting for 5 to 10 hours to polyimidize the polyamic acid while removing the water generated due to the cyclization of amic acid as an azeotrope out of the system. The obtained polyimide is soluble in N-methyl-2-pyrrolidone, N,N-dimethylacetamide, dimethyl sulfoxide, and N,N-dimethylformamide, or the like.

Next, the gas separation membrane comprising the polyimide of the present invention can be manufactured by condensation polymerizing tetracarboxylic dianhydride expressed by the aforementioned general formula (5) and diamine expressed by the aforementioned general formula (6) as a diamine component.

Hereinafter, polyimide forming a gas separation membrane will be explained in detail. The polyimide of the present invention may be any polymers obtained by condensation polymerizing tetracarboxylic dianhydride expressed by the general formula (5) and diamine component expressed by the general formula (6).

Herein, as the compound expressed by the general formula (5), for example, 4,4'-(hexafluoroisopropylidene) diphthalic acid dianhydride, 3,3'-biphenyl tetracarboxylic acid dianhydride or pyromellitic dianhydride are preferably used. As the diamine expressed by the general formula (6), 2-(2,4-diaminobenzyl) pyridine is used.

As mentioned above, the polyimide of the present invention is a polymer obtained by randomly condensation polymerizing tetracarboxylic acid dianhydride as a raw material and a diamine component. Therefore, the polyimide has a plurality of repeating structure units depending on varieties of raw materials and their blending ratio, etc.

In the present invention, in the polyimide in which both tetracarboxylic acid dianhydride and diamine are aromatic and have heat resistant properties; as a basic material of tetracarboxylic acid dianhydride, pyromellitic dianhydride can be mentioned, and as a diamine, 2-(2,4-diaminobenzyl) pyridine can be mentioned. The weight ratio of tetracarboxylic acid dianhydride and diamine component in the polymer obtained by randomly condensation polymerizing thereof is 54.2 wt. % and 45.8 wt. %, respectively.

Moreover, in another embodiment; as a tetracarboxylic acid dianhydride, a mixture comprising the same amount of pyromellitic dianhydride and 4,4'-(hexafluoroisopropylidene) diphthalic acid dianhydride can be mentioned; and as a diamine, 2-(2,4-diaminobenzyl) pyridine can be mentioned. The weight ratio of tetracarboxylic acid dianhydride and diamine in the polymer obtained by randomly condensation polymerizing thereof is 64.3 wt. % and 35.7 wt. %, respectively.

In the polymer obtained by randomly condensation of the present invention, in a case where a plurality of tetracarboxylic acids are used, kinds or mixing ratio of the combination of tetracarboxylic acid dianhydrides are not particularly limited as long as the total molar amount of tetracarboxylic acid dianhydride is equal to the total amount of diamine component.

In the present invention, pyromellitic dianhydride preferably used as the tetracarboxylic acid dianhydride, is a material constituting a minimum molar amount among a tetracarboxylic acid dianhydrides. On the other hand, in the present invention, as diamine, 2-(2,4-diaminobenzyl) pyridine is preferably used. Therefore, in the present invention, as long as 2-(2,4-diaminobenzyl) pyridine is used as a diamine, the weight ratio of the component in the polymer obtained by randomly condensation of tetracarboxylic acid dianhydride and 2-(2,4-diaminobenzyl) pyridine as a diamine, which have the same molar weight, is not less than 54.2 wt. % and not more than 45.8 wt. %, respectively.

As the polyimide used in the second invention, a polyimide whose intrinsic viscosity is in the range of 0.4 to 1.5, preferably in the range of 0.5 to 1.0 when measured with the solution in which 0.5 g of polyimide is dissolved in 1 dl of N-methyl-2-pyrrolidone at 30° C. is preferred. If the polyimide of too small intrinsic viscosity is used and made into a gas separation membrane, the membrane is inferior in the self-supporting property and lacks in the mechanical strength. On the other hand, if the intrinsic viscosity is too large, a uniform membrane-forming solution cannot easily be obtained and a membrane formation becomes difficult.

The gas separation membrane of the present invention can be manufactured by various methods. A method for manufacturing a uniform membrane comprises dissolving the polyimide expressed by the general formula (1) in a solvent for forming membrane to make a uniform membrane-forming solution; casting the obtained solution onto the appropriate supporting base materials; and then evaporating the solvent by means of a heating process or a heating process under reduced pressure. In order to attain the practical gas permeation performance, namely, to attain a large permeation rate, the membrane is required to be sufficiently thin. However, from the viewpoint of the mechanical strength and the occurrence of pinholes, the thickness of membrane is preferred to be in the range of 0.03 $\mu$m to 20 $\mu$m. As the solvent for forming membrane, the same as those of the polymerization reacting agent, organic solvent such as N-methyl-2-pyrrolidone, N,N-dimethylacetamide, dimethyl sulfoxide, N,N-dimethylformamide or the like, are preferred. The supporting base materials to which the membrane forming solution is applied are not particularly limited. The examples of such supporting base materials include members having smooth surfaces, such as heat resistant polymer, glass, metal, ceramic, etc. The heating temperature after the membrane forming solution is applied to the supporting base material depends on the kinds of solvents of membrane forming solution. However, in the case of the above mentioned organic solvent, the heating temperature is in the range of 80 to 200° C., preferably in the range of 100 to 150° C. More preferably, after almost all of the solvent is evaporated at the above ranging temperature, all solvent is completely evaporated by heating at 200 to 300° C. Moreover, a non-uniform membrane can be formed by applying the membrane forming solution onto the supporting base material; then dipping with water or organic solvent that can be mixed with the above mentioned organic solvents (poor solvent for polyimide); and drying at the above mentioned temperatures. The methods for forming the membrane or the form of the membrane are not limited. The membrane may be a composite membrane. As to the membrane form, flat membrane, hollow fiber membrane, etc. are possible.

The terms for describing the membrane performance of the present invention are defined as follows.

(1) Gas Permeation Coefficient

A coefficient showing the permeation rate of gas for semipermeable membrane. The unit is expressed by the following equation (1).

Equation (1)

$$\text{Barrer} = 10^{-10} \text{ cm}^3 \text{ (STP) cm/cm}^2\text{/sec/cmHg}$$

where "cm$^3$(STP)" shows a volume of gas that permeates at normal temperature (0° C.) and normal pressure (1 atm), "cm" shows a thickness of a film, "cm²" shows an area of a film, "sec" shows a time (second) and "cmHg" shows a pressure. The measurement data are values at 25° C. and 1 atm.

(2) Selectivity

A gas selectivity of a semipermeable membrane is expressed by the ratio of the permeability coefficients of individual gases which are measured when they permeate the same membrane. For example, $CO_2/N_2=50$ means that the membrane permeates $CO_2$ gas at the rate 50 times that of $N_2$ gas. The measurement data are values at 25° C. and 1 atm.

obtained. 26.9 g (0.264 mol) of acetic anhydride and 26.7 g (0.264 mol) of triethylamine were added to this polymerization solution and reacted at room temperature for 20 hours. Then the reacted material was placed in the mixture solution of water and alcohol, and thus the deposition of polyimide resin was obtained. Moreover, this flask was washed with alcohol several times. The intrinsic viscosity of the polyimide resin was 0.72 (dL/g) (0.5 g/dL, NMP, 30° C.). The steps of the above mentioned chemical reaction are expressed by the following formula (19).

Chemical Formula 19

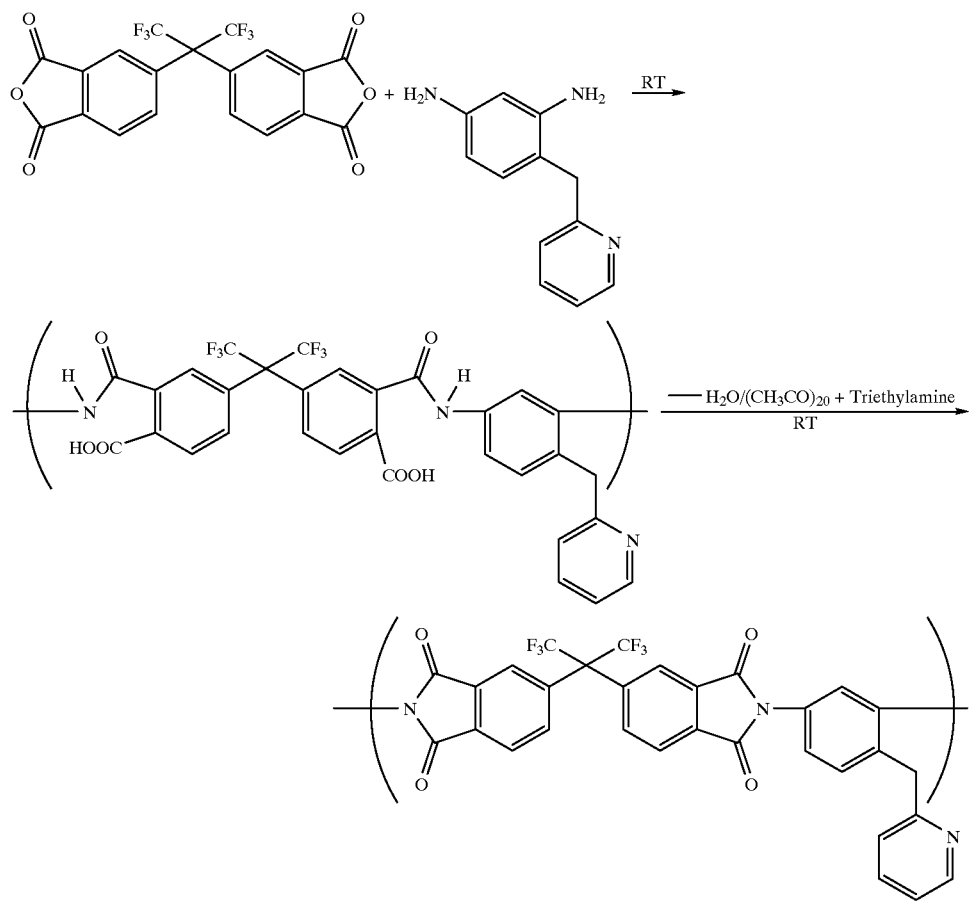

Hereinafter, the invention will be explained with reference to Examples and Comparative Examples, but is not limited to them alone.

Example 1

15.0 g (0.0754 mol) of diaminobenzylpyridine and 200 ml of N-methyl-2-pyrrolidone were placed in a 1000 ml three-neck flask and dissolved by stirring in an argon gas atmosphere. This flask was placed in a water bath of 10 to 15° C., followed by adding 33.4 g (0.0754 mol) of 4,4'-(hexafluoroisopropylidene) diphthalic acid dianhydride, dividing it into four parts over the course of 1 hour. After the addition, this flask is allowed to reach room temperature and stirred to react for 20 hours, and thus polyamic acid was The identification data of the polymer obtained in the above mentioned manner are shown in FIGS. 1 and 2. FIG. 1 is an analysis chart by nuclear magnetic resonance (NMR) of the polyimide according to Example 1 of the present invention. Each number of peaks shows each connection in the polymer structure formula shown in the upper left portion of this chart. As an analysis apparatus, FT—NMR: LA 400 (the product of JEOL LTD.) was used. The measurement was conducted under the following conditions: DMSO-$d_6$ was used as the solvent to make a solution having a concentration of 50 mg/0.5 ml; the number of times of integrating was 160 times; $^1H$ resonance frequency was 400 MHz; the pulse width was 6.4 μsec (45° pulse); the internal standard was DMSO-d₆(2.5 ppm); observation center frequency was 399.78457419 MHz; and the observation range was 8 KHz.

Next, FIG. 2 is an analysis chart by infrared analysis (IR) of polyimide. As an analysis apparatus, microscope FT - IR:FTS - 40, UMA 300A (the product of Bio - Rad Laboratories) was used. As to the preparation of samples or the method of analysis: microscope FT - IR determination of the samples washed with hexane was conducted by using a compression cell. The observation conditions were as follows: the measurement mode was permeation; the separation performance was 8 cm$^{-1}$; the number of times of integrating was 128 times; the measurement range was 4000 to 7000 cm$^{-1}$.

The above obtained polyimide resin was dissolved in N-methyl-2 pyrrolidone at 9 wt. % concentration. And the solution was cast to the glass board and the solvent was removed by the use of a vacuum heating dryer, followed by conducting a heating procedure in N₂ gas atmosphere at 200 to 300° C. for 5 hours. At that time, the glass transition temperatures and gas permeation coefficients were measured. The results are shown in Table 1.

COMPARATIVE EXAMPLE 1

A polyimide having the intrinsic viscosity of 0.53 (dL/g) was obtained by the method of Example 1 except that 44.5 g (0.10 mol) of 4,4'-(hexafluoroisopropylidene) diphthalic dianhydride as a tetracarboxylic acid dianhydride and 12.5 g (0.100 mol) of 2,4-diamino toluene as the diamine were used. The glass transition temperature and gas permeation coefficients were measured and the results were shown in Table 1.

TABLE 1

| | Glass transition temperature (° C.) | Gas permeation coefficients (Barrer*1) | | | | Selectivity (—) | | |
|---|---|---|---|---|---|---|---|---|
| | | O₂ | CH₄ | N₂ | CO₂ | O₂/N₂ | CH₄/N₂ | CO₂/N₂ |
| Example 1 | 303 | 7.22 | 1.67 | 1.34 | 54.9 | 5.38 | 1.25 | 40.9 |
| Comparative Example 1 | 342 | 7.12 | 0.86 | 1.23 | 20.5 | 5.79 | 0.70 | 16.7 |

(remark *1) Barrer = × 10$^{-10}$ cm³ (STP) cm/cm²/sec/cmHg

As is apparent from Table 1, the gas separation membrane of the Example of the present invention was much higher in gas permeation performance and selectivity than that of the Comparative Example.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. A polyimide having a repeating structure unit expressed by the following general formula (1):

General Formula (1)

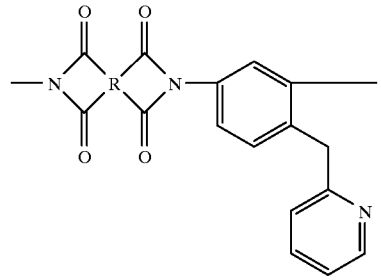

where R denotes a quadrivalent organic group.

2. The polyimide according to claim 1, wherein said quadrivalent organic group is at least one organic group selected from the group consisting of organic groups expressed by the following general formulas (2) to (4):

General Formula (2)

General Formula (3)

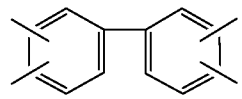

General Formula (4)

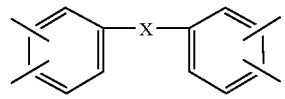

where X denotes at least one group selected from the group consisting of —C(CF₃)₂—, —C(CF₃)(C₆H₅)—, —C(CH₃)(C₆H₅)—, —CH₂—, —C(CH₃)₂—, —CO—, —SO₂—, —O—, —S—, —NH—, —COO—, —CONH—, —Si(CH₃)₂—, —O—C₆H₄—C(CH₃)₂—C₆H₄—O—, —O—C₆H₄—O—, —O—CH₂—CH₂—O—, —CF₂CF₂CF₂—, —CO—C₆H₄—CO—, and —O—C₆H₄—S—C₆H₄—O—.

3. The polyimide according to claim 1, wherein the glass transition temperature of the polyimide is about 303° C.

4. The polyimide according to claim 1, wherein gas permeability coefficients of the polyimide (Barrer=10$^{-10}$ cm³ (STP) cm/cm²/sec/cmHg, where cm³ (STP) shows a volume of gas that permeates at normal temperature (0°0 C.) and normal pressure (1 atm), cm shows a thickness of a film, cm² shows an area of a film, sec shows a time (second) and cmHg shows a pressure, and where the values are measured at 25° C. and 1 atm) are about 7.22 Barrer for O₂, about 1.67

Barrer for $CH_4$, about 1.34 Barrer for $N_2$ and about 54.9 Barrer for $CO_2$.

5. The polyimide according to claim 1, wherein the polyimide has a property of dissolving in a polar solvent.

6. The polyimide according to claim 5, wherein said polar solvent is at least one solvent selected from the group consisting of N-methyl-2-pyrrolidone, N,N-dimethylacetamide, dimethyl sulfoxide, and N,N-dimethylformamide.

7. A method for manufacturing a polyimide having a repeating structure unit expressed by the following general formula (7) by condensation polymerizing a tetracarboxylic acid dianhydride expressed by the following general formula (5) and diamine expressed by the following general formula (6):

General Formula (5)

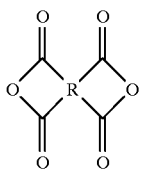

where R denotes a quadrivalent organic group;

General Formula (6)

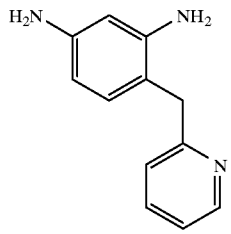

General Formula (7)

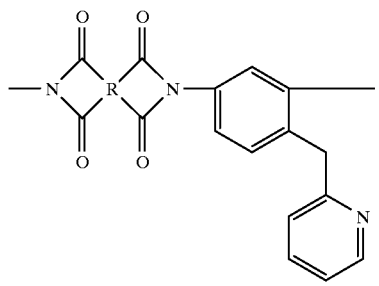

where R denotes a quadrivalent organic group.

8. The method for manufacturing a polyimide according to claim 7, wherein said quadrivalent organic group is at least one organic group selected from the group consisting of organic groups expressed by the following general formulas (8) to (10);

General Formula (8)

General Formula (9)

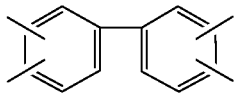

General Formula (10)

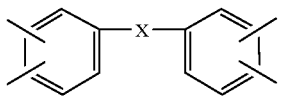

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —CF$_2$CF$_2$CF$_2$—, —CO—C$_6$H$_4$—CO—, and —O—C$_6$H$_4$—S—C$_6$H$_4$—O—.

9. The method for manufacturing a polyimide according to claim 7, wherein said condensation polymerization is conducted in a polar solvent.

10. The method for manufacturing a polyimide according to claim 9, wherein said polar solvent is at least one solvent selected from the group consisting of N-methyl-2-pyrrolidone, N,N-dimethylacetamide, dimethyl sulfoxide and N,N-dimethylformamide.

11. The method for manufacturing a polyimide according to claim 9, wherein the amount of the polar solvent is in the range of 70 to 90 weight % concentration with respect to the weight of the reaction system.

12. The method for manufacturing a polyimide according to claim 7, wherein the condensation polymerization comprises the steps of: synthesizing polyamic acid by mixing and reacting diamine component and tetracarboxylic acid dianhydride component for 5 to 50 hours; and polyimidizing the polyamic acid.

13. The method for manufacturing a polyimide according to claim 12, wherein said condensation polymerization is carried out below room temperature (in the range of 0 to 20° C.).

14. The method for manufacturing a polyimide according to claim 12, wherein said polyamic acid is polyimidized by adding a cyclodehydracting agent to the reaction solution and reacting at room temperature (in the range of 20 to 30° C.) for 5 to 24 hours during said step of polyimidizing the polyamic acid.

15. The method for manufacturing a polyimide according to claim 14, wherein said cyclodehydrating agent is at least one compound selected from the group consisting of acetic anhydride, pyridine and triethylamine.

16. The method for manufacturing a polyimide according to claim 12, wherein the step of polyimidizing polyamic acid comprises heating polyamic acid to 180 to 200° C.; and adding a solution azeotropic with water to react for 5 to 10 hours while removing water generated due to the cyclization of amic acid out of the system by azeotropy.

17. The method for manufacturing a polyimide according to claim 16, wherein said solution azeotropic with water is at least one solution selected from the group consisting of benzene, toluene, xylene, chlorobenzene and dichlorobenzene.

18. The method for manufacturing a polyimide according to claim 7, wherein the obtained polyimide is dissolved in a polar solvent.

19. The method for manufacturing a polyimide according to claim 18, wherein said polar solvent is at least one solvent selected from the group consisting of N-methyl-2-pyrrolidone, N,N-dimethylacetamide, dimethyl sulfoxide, and N,N-dimethylformamide.

20. A gas separation membrane having a repeating structure unit expressed by the following general formula (11):

General Formula (11)

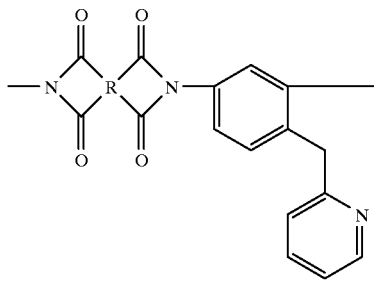

where R denotes a quadrivalent organic group.

21. The gas separation membrane according to claim 20, wherein said quadrivalent organic group is at least one organic group selected from the group consisting of organic groups expressed by the following general formulas (12) to (14):

General Formula (12)

General Formula (13)

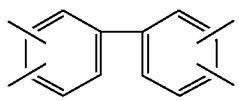

General Formula (14)

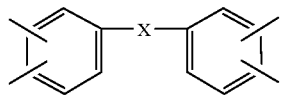

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —CF$_2$CF$_2$CF$_2$—, —CO—C$_6$H$_4$—CO—, and —O—C$_6$H$_4$—S—C$_6$H$_4$—O—.

22. The gas separation membrane according to claim 20, wherein the glass transition temperature of the polyimide is about 303° C.

23. The gas separation membrane according to claim 20, wherein gas permeability coefficients of the polyimide (Barrer=$10^{-10}$ cm$^3$(STP) cm/cm$^2$/sec/cmHg, where cm$^3$ (STP) shows a volume of gas that permeates at normal temperature (0° C.) and normal pressure (1 atm), cm shows a thickness of a film, cm$^2$ shows an area of a film, sec shows a time (second), and cmHg shows a pressure, and where the values are measured at 25° C. and 1 atm) are about 7.22 Barrer for O$^2$, about 1.67 Barrer for CH$_4$, about 1.34 Barrer for N$_2$ and about 54.9 Barrer for CO$_2$.

24. The gas separation membrane according to claim 20, wherein the polyimide membrane shows a gas permeation selectivity of about 5.38 for O$_2$/N$_2$; about 1.25 for CH$_4$/N$_2$; and about 40.9 for CO$_2$/N$_2$.

25. The gas separation membrane according to claim 20, wherein the thickness of the polyimide membrane is in the range of 0.03 to 20 μm.

26. The gas separation membrane according to claim 20, wherein the polyimide membrane is formed on a surface layer of a supporting member having a smooth surface.

27. The gas separation membrane according to claim 20, wherein the polyimide membrane is at least one membrane selected from the group consisting of a flat membrane and a hollow fiber membrane.

28. The gas separation membrane according to claim 20, wherein the polyimide can be dissolved in a polar solvent.

29. The gas separation membrane according to claim 28, wherein said polar solvent is at least one solvent selected from the group consisting of N-methyl-2-pyrrolidone, N,N-dimethylacetamide, dimethyl sulfoxide and N,N-dimethylformamide.

30. The gas separation membrane according to claim 20, wherein the intrinsic viscosity of the polyimide is in the range of 0.4 to 1.5 g/dL when measured with a solution in which 0.5 g of polyimide is dissolved in 1 dl of N-methyl-2-pyrrolidone is dissolved at 30° C.

31. A method for manufacturing a gas separation membrane, which comprises dissolving polyimide having a repeating structure unit expressed by the following general formula (15) in a polar solvent; and forming at least one membrane selected from the group consisting of a flat membrane and a hollow fiber membrane General Formula (15)

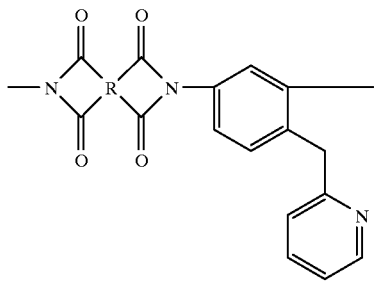

where R denotes a quadrivalent organic group.

32. The method for manufacturing a gas separation membrane according to claim 31, wherein said quadrivalent organic group is at least one organic group selected from the group consisting of organic groups expressed by the following general formulas (16) to (18):

General Formula (16)

General Formula (17)

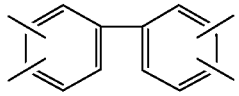

General Formula (18)

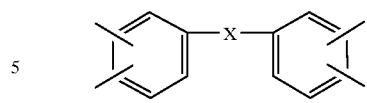

where X denotes at least one group selected from the group consisting of —C(CF$_3$)$_2$—, —C(CF$_3$)(C$_6$H$_5$)—, —C(CH$_3$)(C$_6$H$_5$)—, —CH$_2$—, —C(CH$_3$)$_2$—, —CO—, —SO$_2$—, —O—, —S—, —NH—, —COO—, —CONH—, —Si(CH$_3$)$_2$—, —O—C$_6$H$_4$—C(CH$_3$)$_2$—C$_6$H$_4$—O—, —O—C$_6$H$_4$—O—, —O—CH$_2$—CH$_2$—O—, —O—CF$_2$CF$_2$CF$_2$—, —CO—C$_6$H$_4$—CO—, and —O—C$_6$H$_4$—S—C$_6$H$_4$—O—.

33. The method for manufacturing a gas separation membrane according to claim 31, which comprises casting a solution containing polyimide onto the surface layer of a supporting member having a smooth surface; and then removing the solvent.

34. The method for manufacturing a gas separation membrane according to claim 33, wherein said step of removing the solvent is one process selected from the group consisting of a process of heating and drying, a process of drying under reduced pressure, a process of dissolving solvent and dipping in an organic solvent that is a poor solvent for the polyimide.

* * * * *